US007162462B1

(12) United States Patent
Mutschler, III

(10) Patent No.: US 7,162,462 B1
(45) Date of Patent: Jan. 9, 2007

(54) PROVIDING TIME SENSITIVITY TO AN INFERENCE ENGINE

(75) Inventor: Eugene Otto Mutschler, III, San Clemente, CA (US)

(73) Assignee: Unisys Corporation, Blue Bell, PA (US)

( * ) Notice: Subject to any disclaimer, the term of this patent is extended or adjusted under 35 U.S.C. 154(b) by 520 days.

(21) Appl. No.: 10/388,987

(22) Filed: Mar. 14, 2003

(51) Int. Cl.
*G06F 17/00* (2006.01)
*G06N 5/02* (2006.01)

(52) U.S. Cl. ........................................ 706/47
(58) Field of Classification Search ................ 706/47
See application file for complete search history.

(56) References Cited

U.S. PATENT DOCUMENTS

| 4,787,061 A | * | 11/1988 | Nei et al. ..................... 714/33 |
| 6,697,840 B1 | * | 2/2004 | Godefroid et al. .......... 709/224 |
| 6,782,264 B1 | * | 8/2004 | Anderson ................. 455/456.1 |
| 6,920,468 B1 | * | 7/2005 | Cousins et al. ................ 707/6 |
| 2004/0015079 A1 | * | 1/2004 | Berger et al. ............... 600/437 |

OTHER PUBLICATIONS

Manandhar, S. "Activity Server: You can run but you can't hide." USENIX Summer 1991 (Nashville, TN).*
Brodnik, Andrej and Johan Karlsson. "Multiprocess Time Queue." Lecture Notes in Computer Science. 2001.*
Zaidi, Abbas. "On Temporal Logic Programming Using Petri Nets." IEEE Transactions on Systems, Man, and Cybernetics-Part A: Systems and Humans, vol. 29, No. 3, May 1999.*

Purang, K. "Alma/Carne: implementation of a time-situated meta-reasoner," ictai, p. 103, 13th IEEE International Conference on Tools with Artificial Intelligence (ICTAI'01), 2001.*
Guessoum, Z. and Dojat, M. (1996). A real-time agent model in an asynchronous object environment. In MAAMAW'96, pp. 190-203, NL.*
Hayes-Roth, Barbara. "Opportunistic Control of Action in Intelligent Agents." IEEE Transactions on Systems, Man, and Cybernetics, vol. 23, No. 6. Nov./Dec. 1993.*
Mike Sharples, David Hogg, Chris Hutchinson, Steve Torrance and David Young, "Computers and Thought: A Practical Introduction to Artificial Intelligence—Glossary" (This version was automatically generated for the CogsWeb Project.).*
Patel, Mikael R.K. "queues" (documentation) 1990.*
Manandhar, S. "Activity Server: You can run but you can't hide." USENIX Summer 1991 (Nashville, TN).*
Manandhar, S. "Activity Server: A Model for Everyday Office Activities". M.S. Thesis. M.I.T. 1991.*

* cited by examiner

*Primary Examiner*—David Vincent
*Assistant Examiner*—Benjamin J Buss
(74) *Attorney, Agent, or Firm*—Phuong-Quan Hoang; Mark T. Starr; Richard Gregson

(57) ABSTRACT

An embodiment of the present invention is a technique to provide time sensitivity to an inference engine. A time function is associated to an event object and a rule object in a rule engine using a dynamic object. The event object represents one of an event and a fact. The rule object represents a rule associated with the event object. Time-related information on the dynamic object is obtained using a timed fact object and the time function. The timed fact object corresponds to the event object. A time queue containing the timed fact object is updated using the time-related information. The updated time queue updates status of a condition of the rule.

24 Claims, 12 Drawing Sheets ents of the invention relates to the field of
PROVIDING TIME SENSITIVITY TO AN INFERENCE ENGINE

BACKGROUND

1. Field of the Invention

Embodiments of the invention relates to the field of rule-based systems, and more specifically, to inference engines.

2. Description of Related Art

Inference engines are increasingly being used as a means to perform decisions in a wide variety of applications in business, science, engineering, etc. Typically, the decisions are formulated as a set of rules of the general form "if c then r" where c is a testable condition and r is an action. As conditions change, rules execute, or fire, when all of the conditions in c are met. The firing of a rule may result in either a change in the conditions of some other rule(s) or action(s) to modify the system, leading to an orderly and efficient execution of actions.

However, current inference system technologies are not well suited to the task of managing dynamic systems. A dynamic system is a system where actions are not performed merely on static events, but also on time-related events. Examples of time-sensitive rules are "If a disk error occurs more than three times in an hour, send a message to the tech center", "If the disk error rule has fired within the last 24 hours, do not fire it again, even when the other conditions are met".

SUMMARY OF THE INVENTION

An embodiment of the present invention is a technique to provide time sensitivity to an inference engine. A time function is associated to an event object and a rule object in a rule engine using a dynamic object. The event object represents one of an event and a fact. The rule object represents a rule associated with the event object. Time-related information on the dynamic object is obtained using a timed fact object and the time function. The timed fact object corresponds to the event object. A time queue containing the timed fact object is updated using the time-related information. The updated time queue updates status of a condition of the rule.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the present invention is a technique to provide time sensitivity to an inference engine. A time function is associated to an event object and a rule object in a rule engine using a dynamic object. The event object represents one of an event and a fact. The rule object represents a rule associated with the event object. Time-related information on the dynamic object is obtained using a timed fact object and the time function. The timed fact object corresponds to the event object. A time queue containing the timed fact object is updated using the time-related information. The updated time queue updates status of a condition of the rule.

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
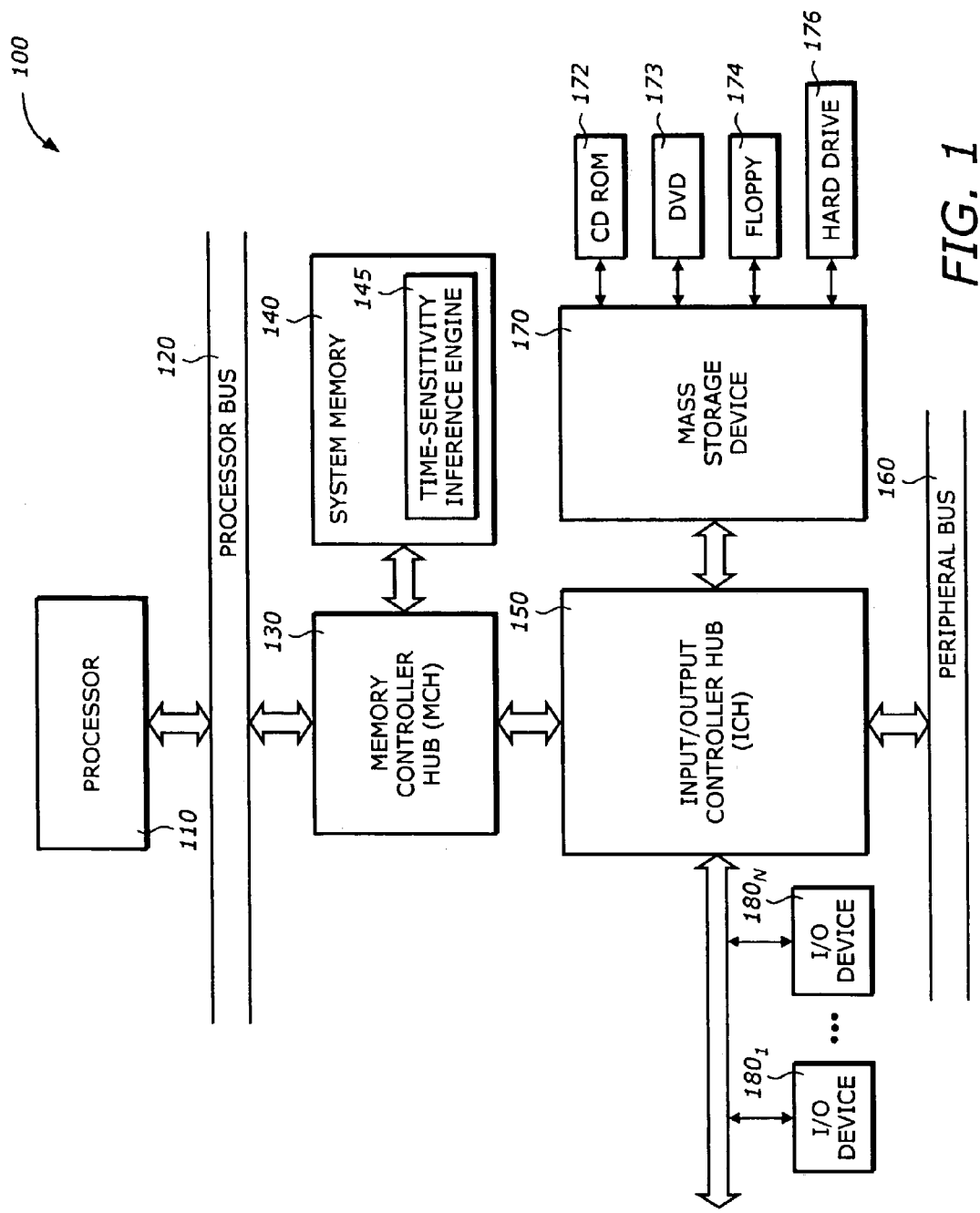
FIG. 1 is a diagram illustrating a computer system in which one embodiment of the invention can be practiced.

FIG. 1 is a diagram illustrating a system 100 in which one embodiment of the invention can be practiced. The system 100 includes a processor 110, a host bus 120, a memory control hub (MCH) 130, a system memory 140, an input/output control hub (ICH) 150, a peripheral bus 155, a mass storage device 170, and input/output devices $180_1$ to $180_N$. Note that the system 100 may include more or less elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a time-sensitivity inference engine 145. Any one of the elements of the time-sensitivity inference engine 145 may be implemented by hardware, software, firmware, microcode, or any combination thereof. The system memory 140 may also include other programs or data which are not shown, such as an operating system. The time-sensitivity inference engine 145 may implement all or part of the time-sensitivity inference engine functions. The time-sensitivity inference engine 145 may also simulate the time-sensitivity inference engine functions. The time-sensitivity inference engine 145 contains instructions that, when executed by the processor 110, causes the processor to perform the tasks or operations as described in the following.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, a digital video/versatile disc (DVD) 173, floppy drive 174, and hard drive 176, and any other magnetic or optic storage devices. The mass storage device 170 provides a mechanism to read machine-accessible media. The machine-accessible media may contain computer readable program code to perform tasks as described in the following.

The I/O devices $180_1$ to $180_N$ may include any I/O devices to perform I/O functions. Examples of I/O devices $180_1$ to $180_N$ include controller for input devices (e.g., keyboard, mouse, trackball, pointing device), media card (e.g., audio, video, graphics), network card such as Institute of Electrical and Electronics Engineers (IEEE) 802.3, IEEE-1394, IEEE-802.11x, Bluetooth, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 2:
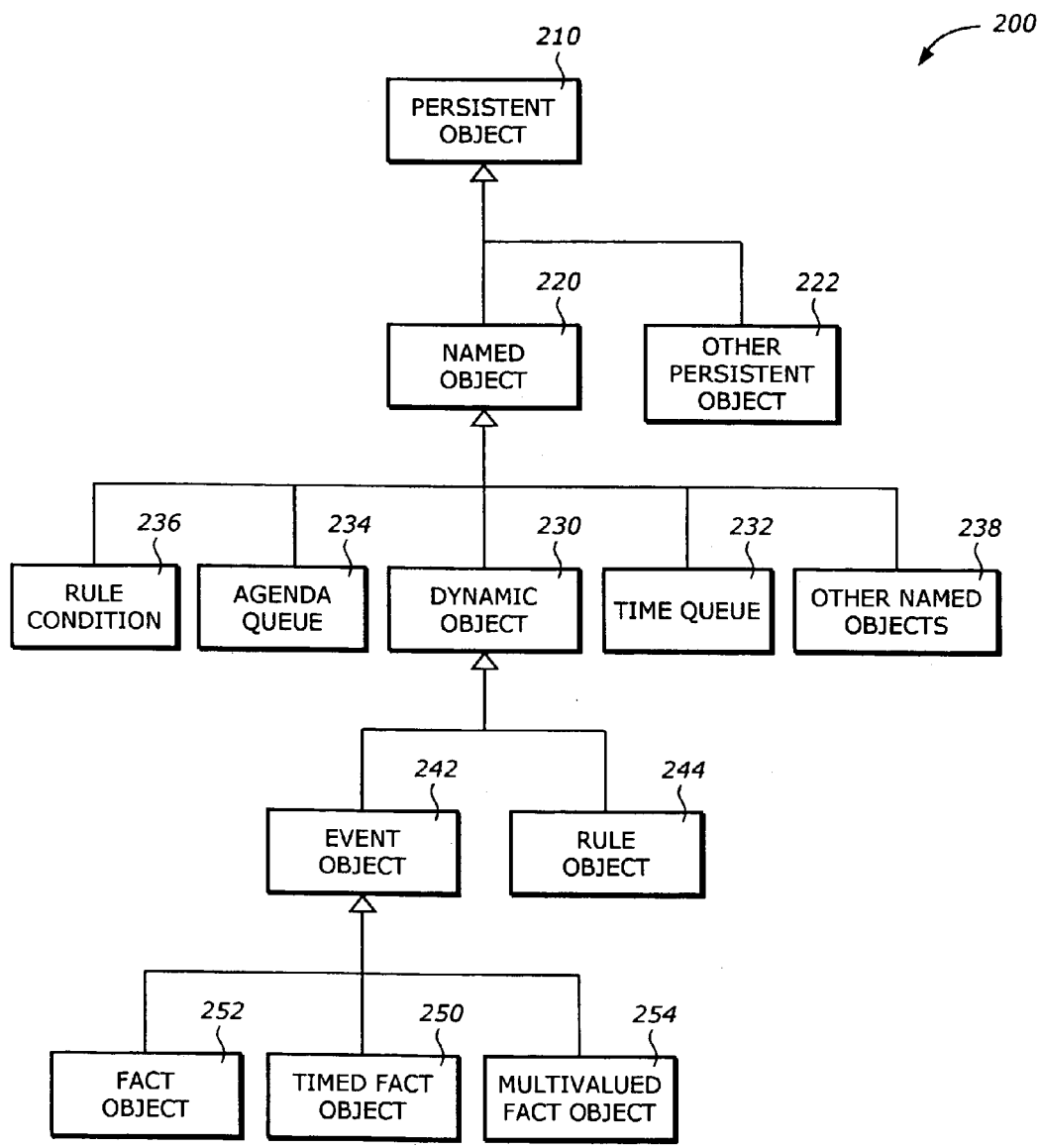
FIG. 2 is a diagram illustrating a class inheritance of the rule engine according to one embodiment of the invention.

FIG. 2 is a diagram illustrating a class inheritance tree 200 of the rule engine according to one embodiment of the invention. The class inheritance tree 200 includes a persistent object 210, a named object 220, other persistent objects 222, a dynamic object 230, a time queue 232, other named objects 234, an event object 242, a rule object 244, a timed fact object 250, a fact object 252, and a multivalued fact object 254. Note that the class inheritance tree 200 may contain more or less objects than shown in FIG. 2. The diagram shown in FIG. 2 is similar to a Unified Modeling Language (UML) class diagram. Note that although the description may use object-oriented programming methodology, the invention can be practiced using any other methodologies. For example, the effect of a common superclass can be achieved by adding structure fields or data areas representing the attribute data of the superclass to these structures or data blocks and providing procedures or functions in the rule engine program to access and manipulate them. It is noted that the components of the class inheritance tree 200 represent classes of objects. An object is an instance of the corresponding class. For example, a dynamic object is an instance of the dynamic object class. Although a class and its object may have the same name, the meaning of each is clear according to the context.

The persistent object 210 represents a superclass from which the named object 220 and other persistent objects 222 are derived. These objects are persistent in that they remain in the repository and the state is preserved even when the system is shut down. The other persistent objects 222 may include objects that are part of the inference engine such as a rule engine, a trace tool, an altered event, etc.

The named object 220 represents a superclass from which the dynamic object 230, the time queue 232, an agenda queue 234, a rule condition 236, and other named objects 238 are derived. The dynamic object 230 is a superclass for both the event object 242 and the rule object 244. The dynamic object 230 has attributes and methods that are useful for processing time-sensitive information. The event object 242 is a superclass from which the timed fact object 250, the fact object 252, and the multivalued fact object 254 are derived. The event object 242 represents events or facts in the system. The timed fact object 250 represents a time-sensitive event or fact. The fact object 252 represents a single piece of information. The multivalued fact object 254 represents arrays of information. The rule object 244 represents the rules that act on the events. By providing a common superclass for both events and rules, the invention allows them to share data and methods relating to their common dynamic behavior over time. The agenda queue 234 contains rules that are ready to be fired because their conditions have been determined to be satisfied or met. The rule condition 236 represents constraints to be satisfied for a rule to be satisfied and placed in the agenda queue. The other named objects 238 may include a rule group or any other suitable elements. The rule group contains groups of rules that act for similar event changes.

The timed fact object 250 provides an interface into the time-sensitive components in the inference engine. Since the time fact object 250 is a subclass of the event object 242, it can be used through the normal course of rules processing, through an association between the event object 242 and the rule condition 236.

The time queue 232 represents a queue that contains timed fact objects derived from the timed fact object 250. The time queue 232 is periodically checked to determine if any of the timed fact objects in the queue have been asserted as time passes. When a timed fact object becomes asserted, the rule condition(s) with which it is associated is or are marked satisfied.

Figure 3:
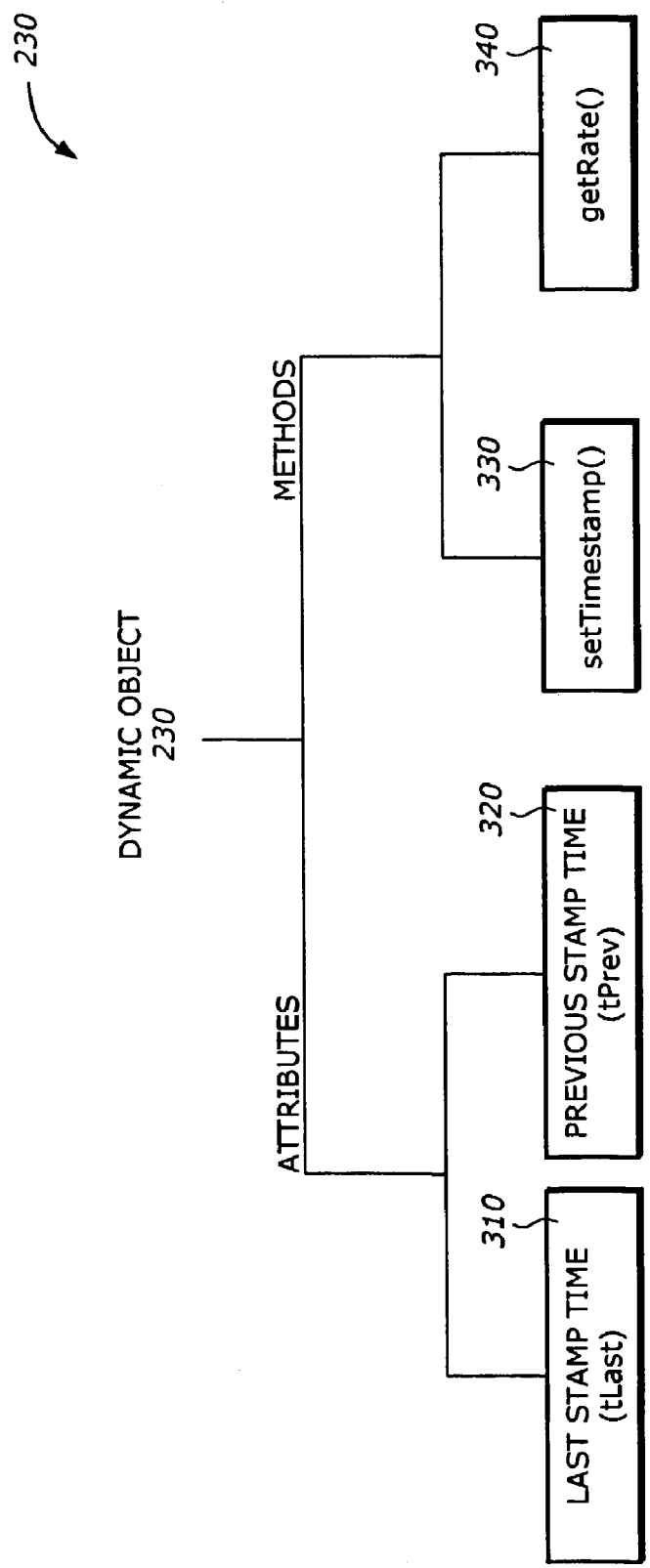
FIG. 3 is a diagram illustrating a dynamic object according to one embodiment of the invention.

FIG. 3 is a diagram illustrating the dynamic object 230 according to one embodiment of the invention. The dynamic object 230 includes the attributes last stamp time (tLast) 310 and previous stamp time (tPrev) 320 and methods setTimestamp( ) 330 and getRate( ) 340.

The last stamp time 310 indicates the last time (date and/or time) that this dynamic object was timestamped. The previous stamp time 320 is the previous value of the last stamp time 310 copied from the last stamp time by the method setTimestamp( ) 330.

The method setTimestamp( ) 330 implements the timestamping process that sets the tLast value. It also calls the incrementOccurrences( ) method of its associated timed fact objects so that they can track the number of these calls. The incrementOccurrences( ) method is described later. The method getRate( ) 340 returns a rate of change which is the rate at which tLast and tPrev are changing. Note that non-object-oriented environment, the effect of these methods can be achieved by creating four procedures that set the event timestamp and the rule timestamp, and get the event rate and the rule rate. These procedures would pass the address of the structure or data block containing the event or rule information and would perform the same processing as described above. Similar techniques can be used including use of pointers, linked lists, structures, etc.

Every time the value of an event or fact in the system is changed or asserted, the method setTimestamp( ) 330 is called for the event or fact object. Similarly, every time a rule in the system is fired, the method setTimestamp( ) 330 is called for the rule object. In the method setTimestamp( ) 330 of a dynamic object, the value of tLast is copied to tPrev and the tLast value is set to the current date and time, accurate to some required degree of resolution (e.g., milliseconds).

Figure 4:
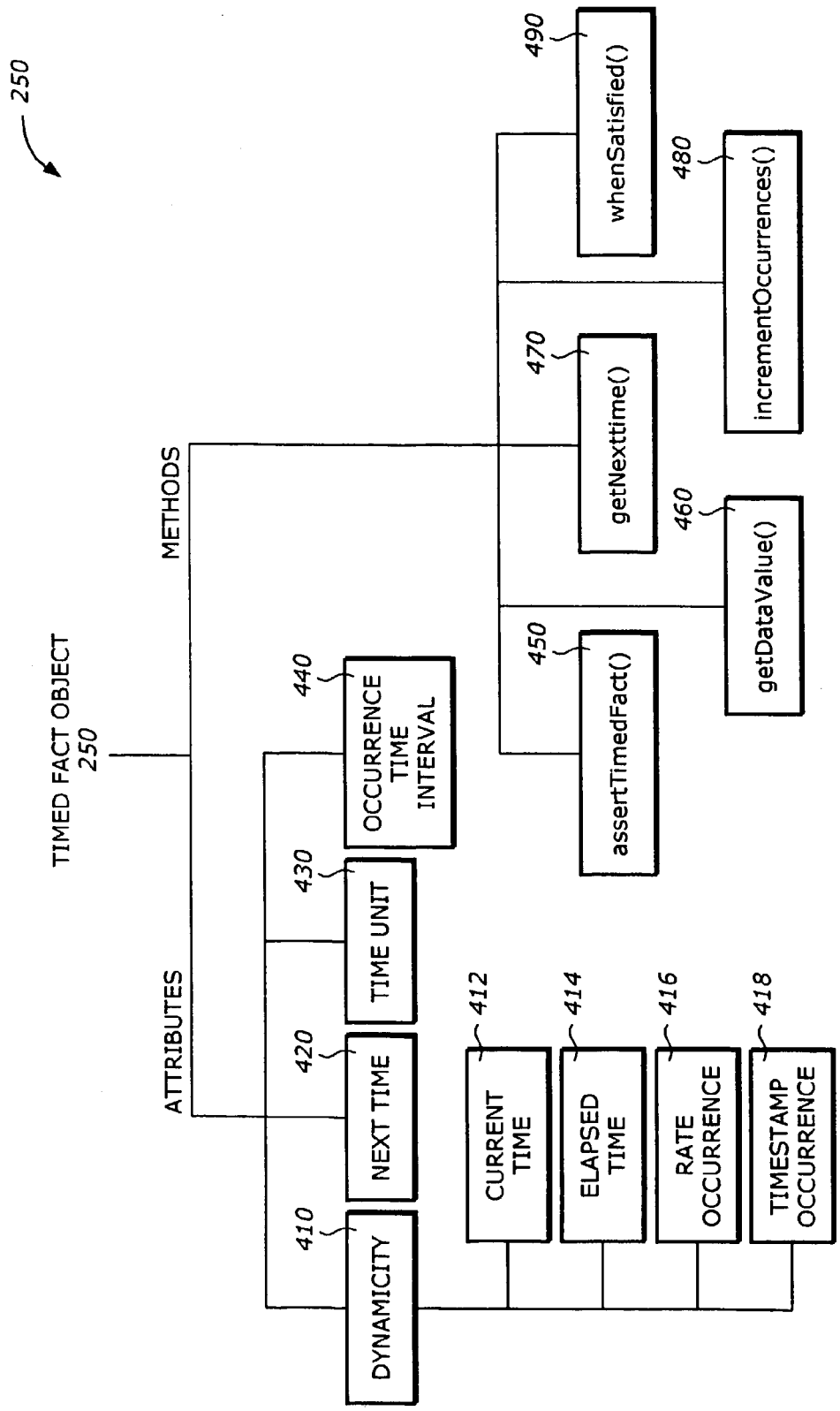
FIG. 4 is a diagram illustrating a timed fact object according to one embodiment of the invention.

In the method getRate( ) 340, the rate of calls to the method setTimestamp( ) 330 is returned in the form of the number of occurrences per time unit of the timestamp. The rate may be increasing or decreasing. The method getRate( ) 340 may be described by the following pseudo-code:

getRate( ):
if the value of tLast is not set, return a zero value (because no call to the method setTimestamp( ) 330 has occurred);
if the value of tprev is not set (indicating only one occurrence has occurred), set the tPrev value to the last time the rules engine was reset, implicitly assuming that the last call to the method setTimestamp( ) 330 occurred at that time;
otherwise, compute time difference=tLast−tPrev, which is the elapsed time between the last two setTimestamp( ) calls;
if time difference is less than or equal to zero (indicating an error condition), return a zero value;
if (tLast+time difference)<the current time, indicating that a previous rate of occurrence has begun to slow down, then set the time difference=current time−tPrev,
return inverse of time difference (1/time difference);

FIG. 4 is a diagram illustrating the timed fact object 250 according to one embodiment of the invention. The timed fact object 250 provides a means to obtain the time-related information about its associated dynamic object 230 and make this information available to the rest of the rules engine in a form that can be used. The timed fact object 250 include attributes dynamicity 410, next time 420, time unit 430, and occurrence time interval 440, and methods assertTimedFact( ) 450, getDataValue( ) 460, getNextTime( ) 470, incrementOccurrences( ) 480, and whenSatisfied( ) 490.

The dynamicity 410 is an enumerated value indicating the type of dynamicity that the timed fact object 250 is expressing. Examples of the dynamicity 410 include a current time dynamicity 412, an elapsed time dynamicity 414, a rate occurrence dynamicity 416, and a timestamp occurrence dynamicity 418. The current time dynamicity 412 indicates some aspect of the current time such as current second, current minute, current hours, etc. The elapsed time dynamicity 414 indicates the amount of time since the associated dynamic object was last timestamped by a call to the method setTimestamp( ) 330. The rate occurrence dynamicity 416 indicates the rate occurrence of the calls to the method setTimestamp( ) 330 on the associated dynamic object. The timestamp occurrence dynamicity 418 indicates the number of calls to the method setTimestamp( ) 330 in a specified recent time interval. The next time 420 is the next time at which the timed fact object 250 is expected to be asserted, or to become true. The time unit 430 is the unit of time in which the timed fact object 250 is to use. The possible values may range from milliseconds to years. The occurrence time interval 440 indicates the number of time units 430 for which the number of occurrence counts is to be maintained. For example, if it is desired to fire a rule based on the number of occurrences of the dynamic object event occurring in 5 minutes, then the value of the attribute unit time 430 is "minute" and the value of the attribute occurrence time interval 440 is 5.

The method assertTimedFact( ) 450 asserts that the timed fact object 250 is true. This assertion means that any rule that uses this fact as part of its set of conditions 236 may be enabled to fire. The method getDataValue( ) 460 returns the current data value of the timed fact object 250. The actual value returned depends on the dynamicity attribute 410 and is recomputed for each call and returned in units that are meaningful for that dynamicity. The method getNextTime( ) 470 indicates the point in time at which the value of the current time unit being used by the timed fact object 250 will change. For example, if the time unit 430 attribute is minute, then this method returns the next minute. The method getNextTime( ) 470 is used by the time queue management routines as will be described later.

The method incrementOccurrences( ) 480 is called by the associated dynamic object 230 as part of its setTimestamp( ) 330 processing. The method incrementOccurrences( ) 470 allows tracking the number of occurrences in a window of specified time interval. The window is maintained as a set of time slices, and the incrementOccurrences( ) 480 call locates and updates the count for the appropriate time slice. The method incrementOccurrences( ) 470 may be described by the following pseudo-code:

prevSliceCounts: A time profile of the occurrence of timestamps of the associated dynamic object. It is implemented as an array of N slices. Each slice is 1/Nth of the last occurrence time interval 440 units of time times the time unit 430. It contains the number of such occurrences in the time interval covered by that slice. As time passes, old slices are dropped and new slices are created. This allows dynamic tracking of the number of events that have occurred in the most recent time interval.
currentSliceEnd: is the time at which the current time slice will end, in the smallest available time units, e.g. milliseconds.
currentSliceCount: is the number of dynamic object events that have occurred in the current time slice.
incrementOccurrences( ):
compute currentTime=the current date and time expressed in the smallest available time units (e.g., milliseconds) (all computations are carried out at this resolution.)
if (currentTime<currentSliceEnd) (indicating we are still in the current time slice)
increment currentSliceCount;
decrement prevSliceCounts[oldest] (the time slice representing the
oldest part of the time window) if it is not already zero;
return;
else (indicating the current slice has expired)
set sliceSize=(occurrence time interval×number of intervals)/N,
which is the size of one of the N time slices in the time windowt slice;
if (currentSliceEnd+sliceSize×N<currentTime)(indicating the entire array has expired)
clear the prevSliceCounts array;
set currentSliceEnd=currentTime+sliceSize;
set currentSliceCount=1;
return;
else (need to drop one or more slices)
drop the oldest slice element;
create a new slice elemen and give it a count of 1;
make the new slice the most recent slice;
add sliceSize to currentSliceEnd to account for this new element;
while (currentSliceEnd<currentTime) (may need to drop more than one) drop the oldest slice element;
add sliceSize to currentSliceEnd to move the slice list forward in time by one slice;

The method whenSatisfied( ) 490 predicts, based on the current event activity of the associated dynamic object 230, when the data value of the timed fact object 250 will meet a given condition. The given condition is supplied in the form of a comparison value, a comparison operator, and an optional delta percentage or value for range comparisons. This condition is usually derived from a condition on a rule 244 and is used to determine if that rule can be placed on the agenda 234 for potential firing. The method whenSatisfied( ) 490 may be described by the following pseudo-code:

numericValue: is the numeric representation of the current data value of the timed fact object as established by the method getDataValue( ) 460.
tSatisfied: (satisfied time) is the time when the method whenSatisfied( ) 490 expects that, given the current activity in the associated dynamic object 230, the timed fact object 250 will be asserted.
whenSatisfied( ):
call getDataValue( ) to ensure that the data value to be checked is current,
set tSatisfied=current time;
if (the optional delta percentage or value is not zero)
set comparison1=one end of the delta range around the comparison value;
set comparison2=other end of the delta range around the comparison value;
else (a single comparison value)
set comparison1=comparison2=the comparison value;
switch on the dynamicity attribute of the tined fact object
current time dynamicity or elapsed time dynamicity:
set tSatisfied to the difference of the numericValue attribute to the
comparison1 and comparison2 values;
if (tsatisfied<current time) set tsatisfied=zero;
rate occurrence dynamicity:
compute tX1=(1/comparison1)+tPrev of the associated dynamic object;
compute tX2=(1/comparison2)+tPrev of the associated dynamic object;

set tSatisfied to the difference of the numericValue attribute to the tX1 and tX2 values;
if (tsatisfied<current time) set tSatisfied=zero;
timestamp occurrence dynamicity:
call getRate( ) on the associated dynamic object to obtain its current rate of timestamps to obtain r, the rate of occurrences of timestamps on the dynamic object;
compute deltaT=(s2−s1)/r where s2 is the comparison value and s1 is the current numericValue;
tsatisfied=current time+deltaT;
if (tsatisfied<current time) set tsatisfied=zero;
return tSatisfied;

If the whenSatisfied( ) time is sooner than the getNext-Time( ) time of the timed fact object, then set the value of the attribute next time of the timed fact object to the whenSatisfied( ) time. Then, the timed fact object is added to the time queue.

Figure 5:
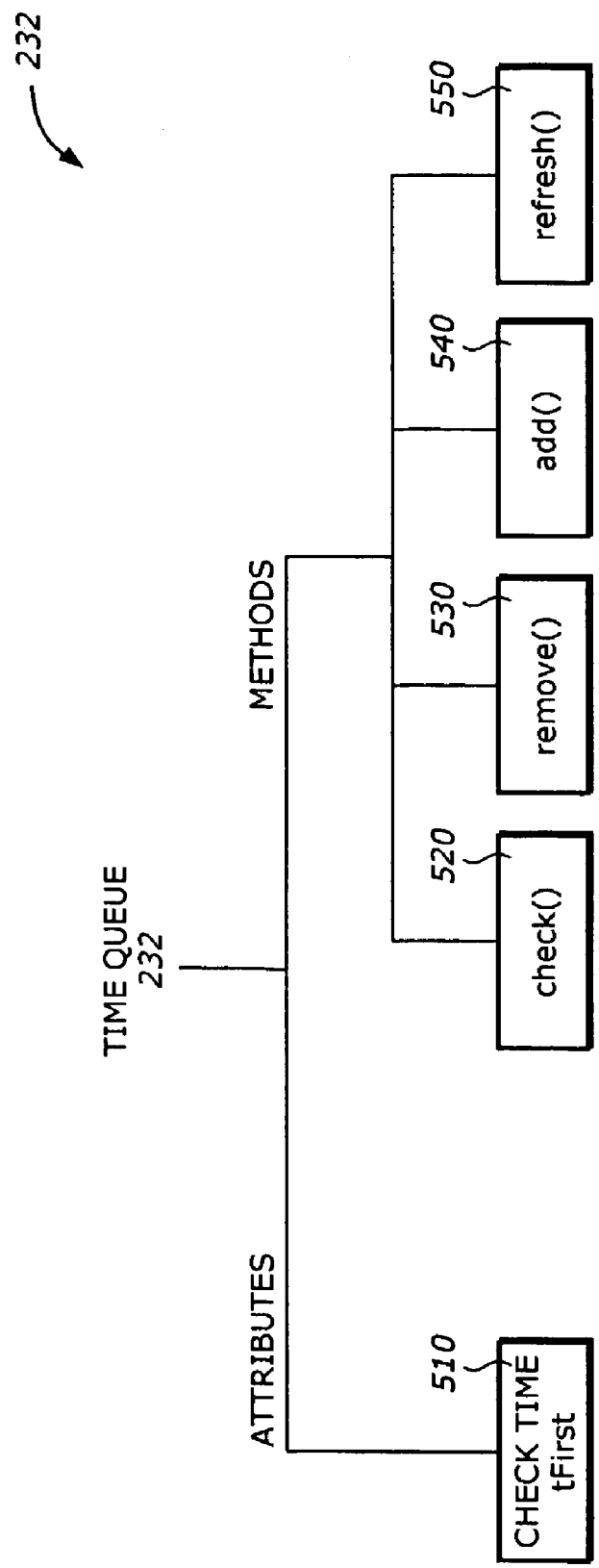
FIG. 5 is a diagram illustrating a time queue according to one embodiment of the invention.

FIG. 5 is a diagram illustrating the time queue 232 according to one embodiment of the invention. The time queue 232 includes attributes check time (tFirst) 510 and methods check( ) 520, remove( ) 530, add( ) 540, and refresh( ) 550. The time queue 232 updates status of a condition in the rule condition 236. The status may be "not satisfied" or "satisfied".

The check time tFirst 510 is the time at which it is necessary to check the time queue 232. The method check( ) 520 calls the method refresh( ) 550 and then returns the object in the queue that has the earliest getNextTime( ) value, if the tFirst time has passed. The method remove( ) 530 removes a timed fact object from the queue. The method add( ) 540 adds a timed fact object to the queue. The method refresh( ) 550 traverses the queue and performs two functions. The first function is to remove those timed fact objects that are no longer usable. The second function is to recompute its tFirst value as the value if the timed fact object 250 with the earliest possible value of its next time attribute value.

The time queue 232 is used in the following manner. When the rules engine is initialized, a global instance of the time queue class is created to give the time queue 232. In the normal iterative process that the rules engine performs searching for rules to fire, the method check( ) 520 is called. If the call to the method check( ) 520 returns a timed fact object 250, the method assertTimedFact( ) 450 is called for that object. This will mark the timed fact object as asserted. In the normal iterative process of the rules engine that checks whether all of the conditions for a rule are satisfied, the value of the asserted timed fact object returned by its getDataValue( ) method is checked to determine if it actually meets the test of the rule condition. If the rule condition is met, the underlying timed fact object is removed from the time queue by passing it as the parameter of a call to the method remove( ) 530 on the global time queue. Otherwise, the timed fact object is re-queued by passing it to the method add( ) 540 of the global time queue.

Figure 6:
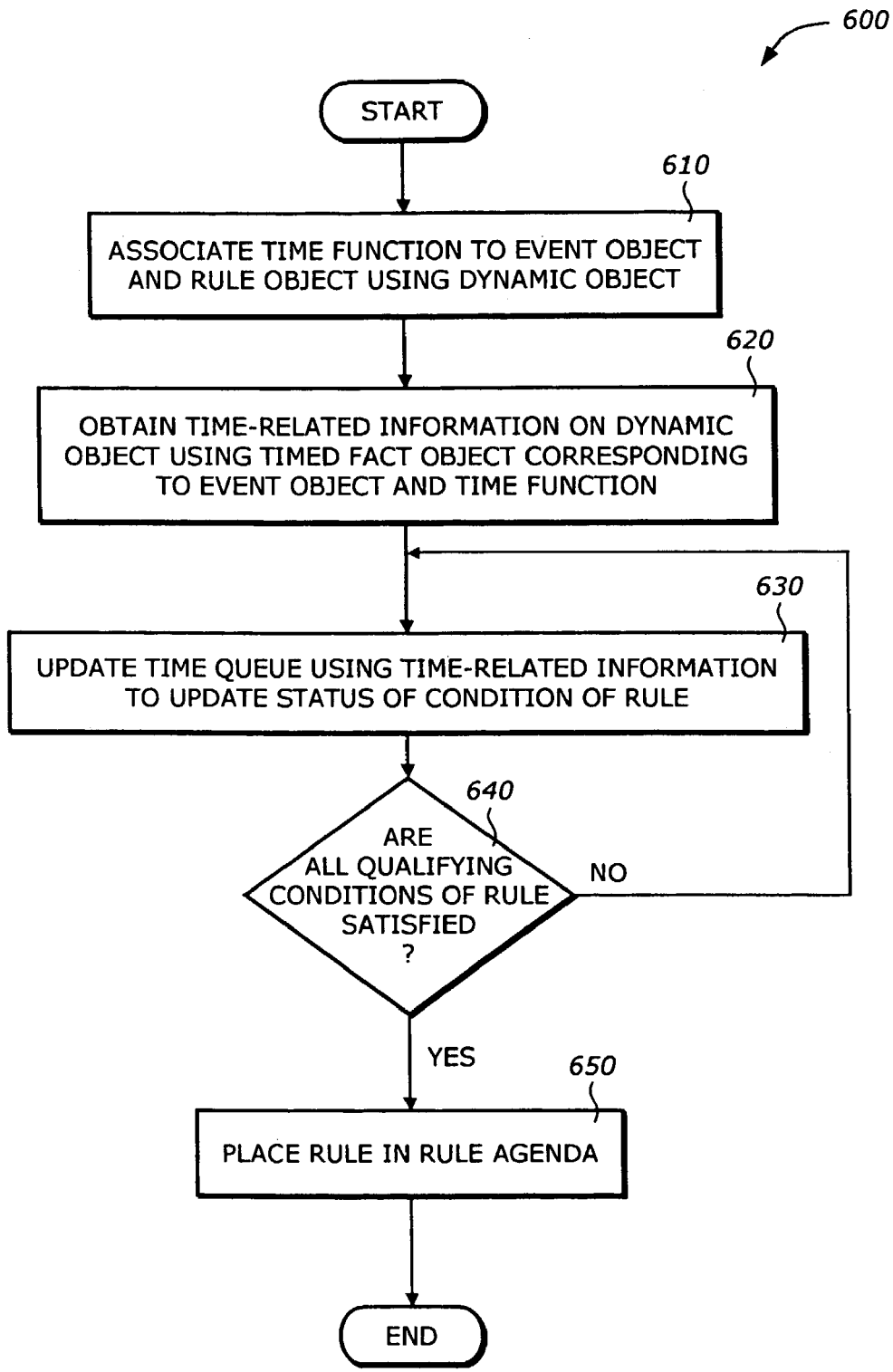
FIG. 6 is a flowchart illustrating a process to provide time sensitivity to an inference engine according to one embodiment of the invention.

FIG. 6 is a flowchart illustrating a process 600 to provide time sensitivity to an inference engine according to one embodiment of the invention.

Upon START, the process 600 associates a time function to an event object or a rule object in the inference engine using a dynamic object (Block 610). Then, the process 600 obtains time-related information on the dynamic object using a timed fact object which corresponds to the event object and the time function (Block 620). Next, the process 600 updates a time queue using the time-related information to update the status of a condition of the rule (Block 630).

Then, the process 600 determines if all the qualifying conditions of the rule have been satisfied (Block 640). If not, the process 600 returns to block 630 or is terminated. Otherwise, the process 600 places the rule in a rule agenda (Block 650) and is then terminated. As discussed above, when the rule is placed in the agenda, it is eligible for firing.

Figure 7:
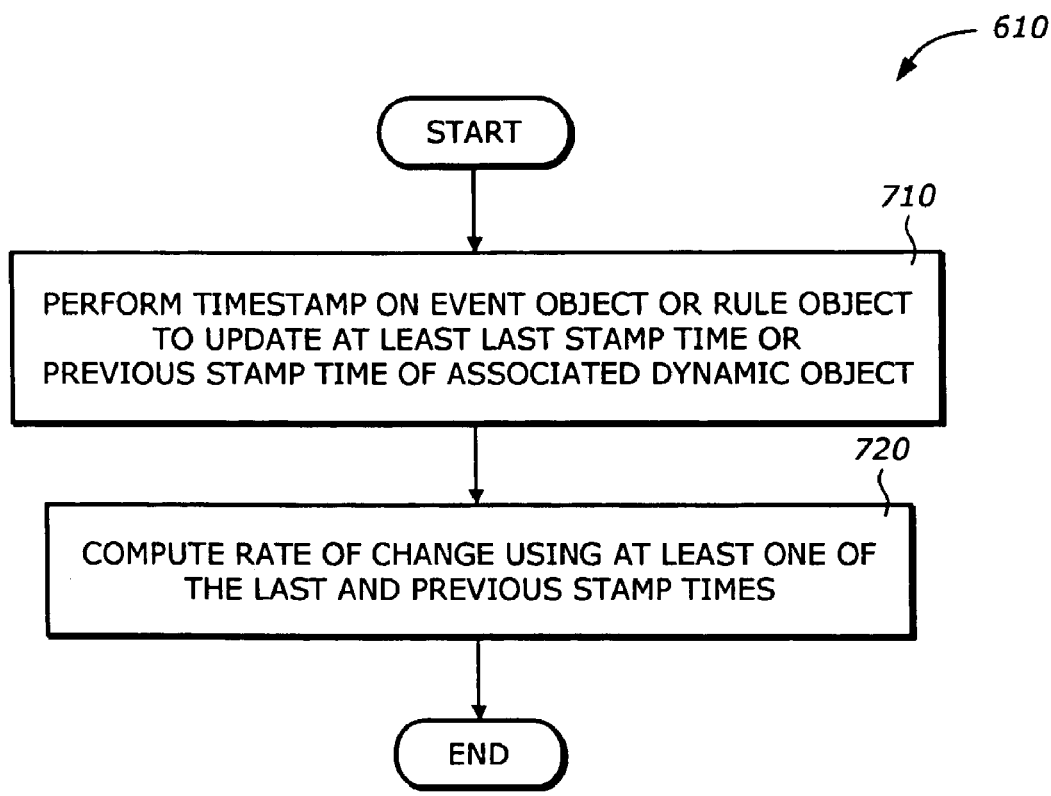
FIG. 7 is a flowchart illustrating a process to associate time function according to one embodiment of the invention.

FIG. 7 is a flowchart illustrating the process 610 to associate time function according to one embodiment of the invention.

Upon START, the process 610 performs a timestamp on the event object or the rule object to update at least one of the last stamp time or the previous stamp time of the associated dynamic object (Block 710). This is achieved by calling the method setTimestamp( ) 330 as discussed above. Next, the process 610 computes a rate of change using at least one of the last stamp time and the previous stamp time (Block 720). This can be achieved by calling the method getRate( ) 340. Then, the process 610 is terminated.

Figure 8:
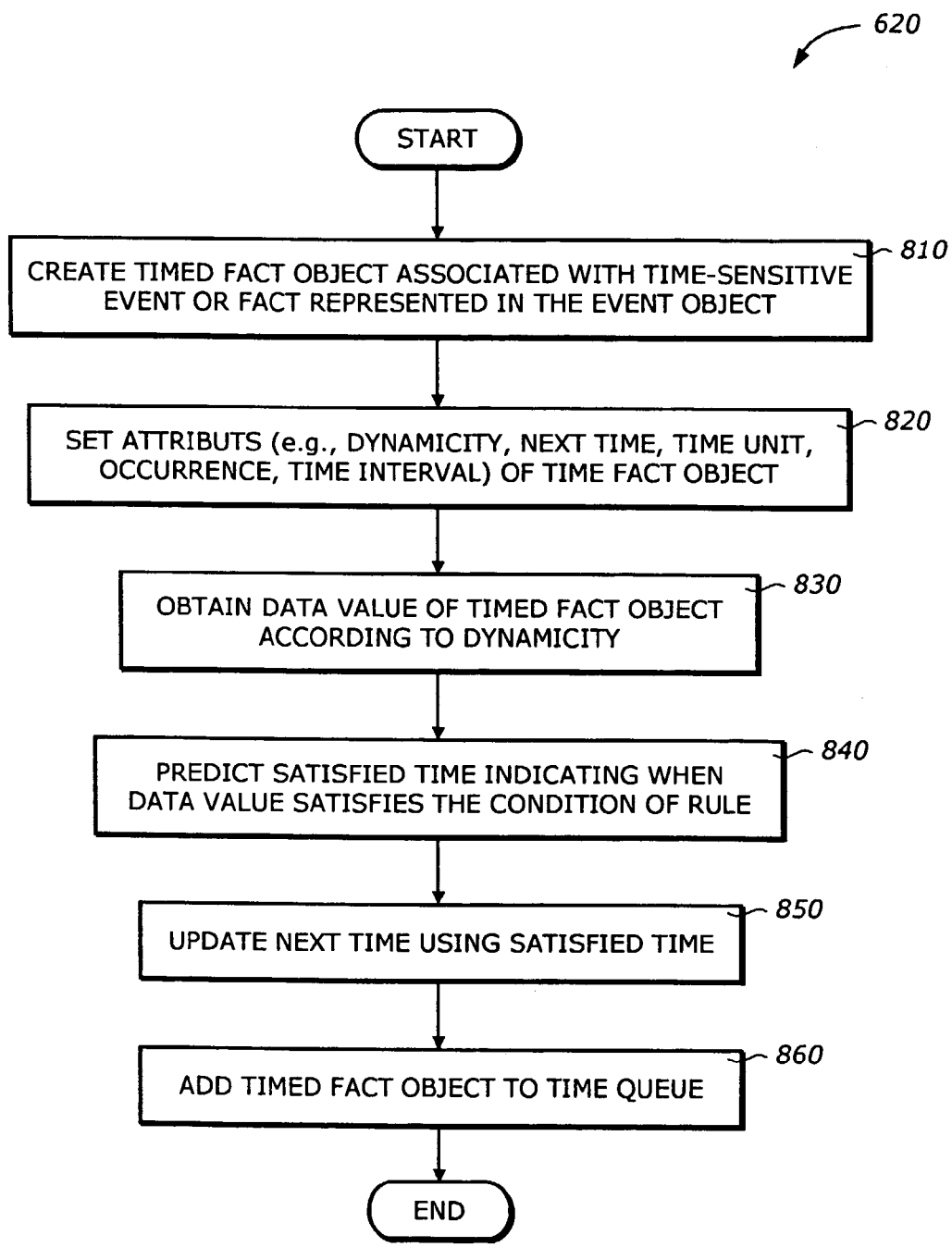
FIG. 8 is a flowchart illustrating a process to obtain time-related information according to one embodiment of the invention.

FIG. 8 is a flowchart illustrating the process 620 to obtain time-related information according to one embodiment of the invention.

Upon START, the process 620 creates a timed fact object associated with a time-sensitive event or fact represented by the event object (Block 810). Next, the process 620 sets the attributes of the timed fact object (Block 820). The attributes may include dynamicity, next time, a time unit, an occurrence time interval. Then, the process 620 obtains the data value of the timed fact object according to the dynamicity (Block 830).

Next, the process 620 predicts the satisfied time indicating when the data value satisfies the condition of the rule (Block 840). This is achieved by calling the method whenSatisfied( ) 490 as discussed above. Then, the process 620 updates the next time using the satisfied time (Block 850). Next, the process 620 adds the timed fact object to the time queue (Block 860) and is then terminated.

Figure 9:
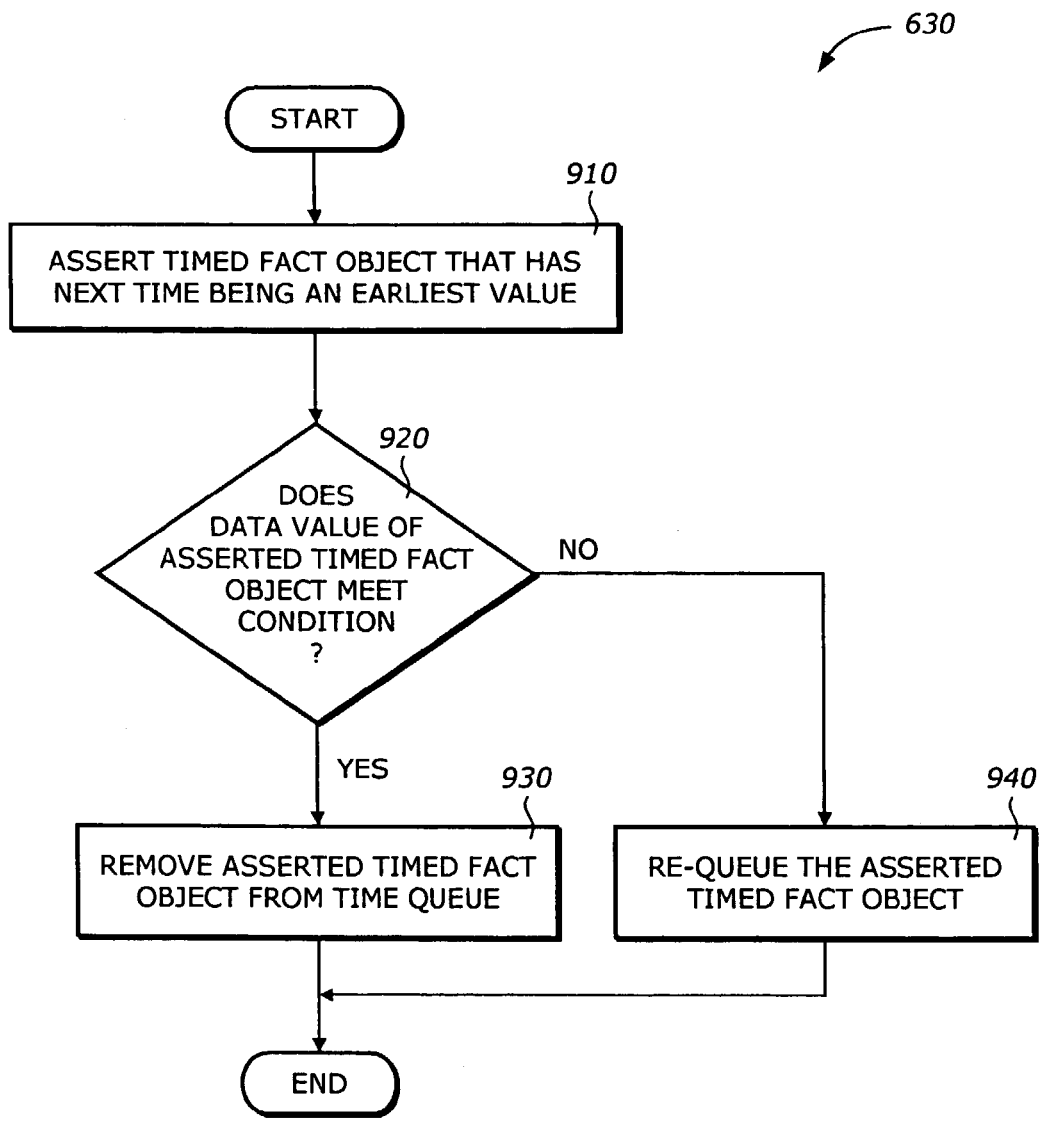
FIG. 9 is a flowchart illustrating a process to update time queue according to one embodiment of the invention.

FIG. 9 is a flowchart illustrating the process 630 to update time queue according to one embodiment of the invention.

Upon START, the process 630 asserts the timed fact object that has the earliest next time (Block 910). Typically, the time queue contains more than timed fact objects with different next times. The timed fact object that has the earliest next time is selected to be asserted, i.e., it is expected to be true at the earliest next time. Then, the process 630 determines if the data value of the asserted timed fact object meet the condition of the rule (Block 920). If not, the process 630 re-queues the asserted timed fact object (Block 940) and is then terminated. In other words, the process 630 adds the asserted timed object back to the time queue so that it can be considered again in subsequent cycles. If the data value meets the rule condition, the process 630 removes the asserted timed fact object from the time queue (Block 930) and is then terminated.

The removal of the asserted timed fact object indicates that a condition of the rule has been satisfied. This conclusion is forwarded to the rule-engine so that the firing of the rule can be considered. If all the qualifying conditions of the rule are satisfied, the rule will be fired.

Figure 10:
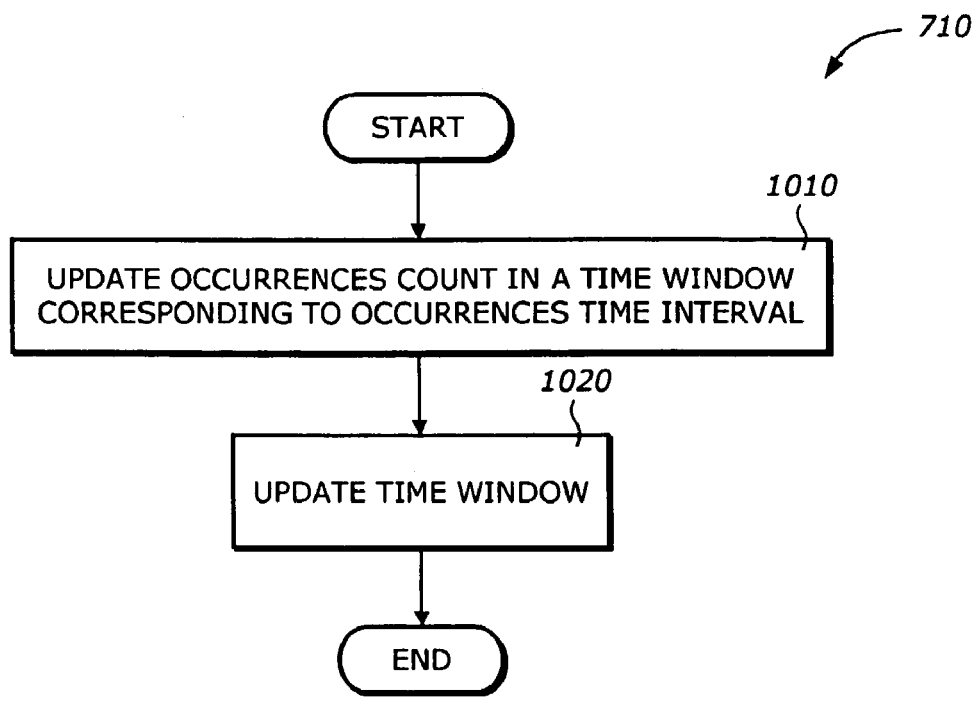
FIG. 10 is a flowchart illustrating a process to perform timestamp according to one embodiment of the invention.

FIG. 10 is a flowchart illustrating the process 710 to perform timestamp according to one embodiment of the invention.

Upon START, the process 710 updates the occurrence count in a time window corresponding to the occurrence time interval (Block 1010). Next, the process 710 updates the window (Block 1020) and is then terminated. This can be achieved by calling the method incrementOccurrences( ) 470 as described earlier.

Figure 11:
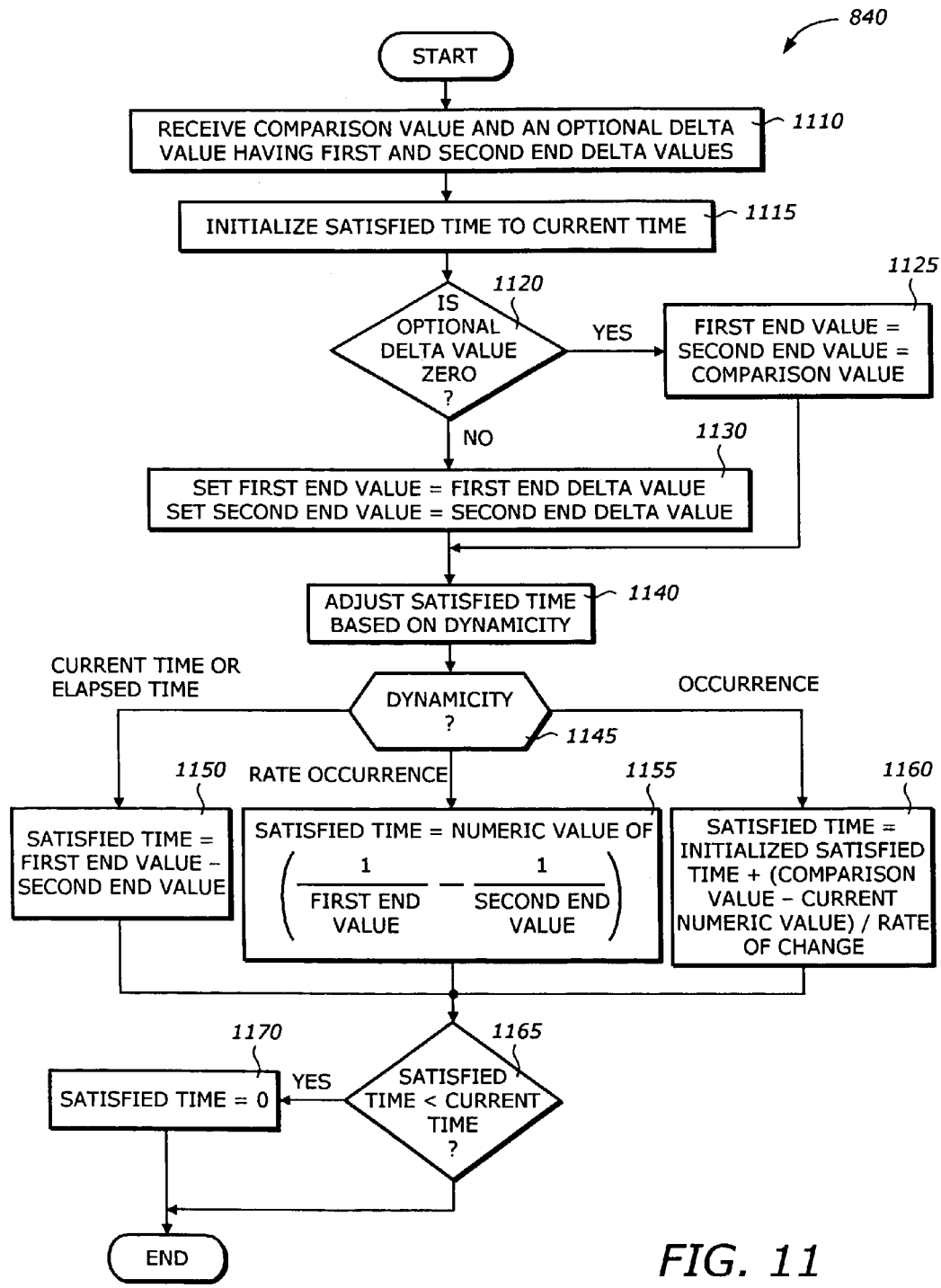
FIG. 11 is a flowchart illustrating a process to predict satisfied time according to one embodiment of the invention.

FIG. 11 is a flowchart illustrating the process 840 to predict the satisfied time according to one embodiment of the invention. The process 840 in essence reflects the method whenSatisfied( ) 490.

Upon START, the process 840 receives a comparison value and an optional delta value having first and second end delta values (Block 1110). The delta value may be in form of a percentage or a number. Then, the process 840 initializes the satisfied time to the current time (Block 1115). Next, the process 840 determines if the optional delta value is equal to zero (Block 1120). If so, the process 840 sets the first and second end values to the comparison value received in Block 1110 (Block 1125). Otherwise, the process 840 sets the first end value to the first end delta value and the second end value to the second end delta value (Block 1130).

Next, the process 840 adjusts the satisfied time based on the dynamicity (Block 1140). The process 840 determines the type of dynamicity (Block 1145). If it is a current time dynamicity or an elapsed time dynamicity, the process 840 adjusts the satisfied time to the difference between the first end value and the second end value (Block 1150). If it is a rate occurrence dynamicity, the process 840 adjusts the satisfied time to the numeric value of the difference between the inverse of the first end value and the inverse of the second end value (Block 1155). If it is the timestamp occurrence dynamicity, the process 840 computes the difference between the comparison value and the current numeric value, divides this difference by the rate of change as determined before to provide a ratio. The process 840 adjusts the satisfied time as the sum of the initialized satisfied time with that ratio (Block 1160).

Next, the process 840 determines if the adjusted satisfied time is less than the current time (Block 1165). If not, the process 8409 is terminated. Otherwise, the process 840 sets the satisfied time to a zero value (Block 1170) and is then terminated.

Figure 12:
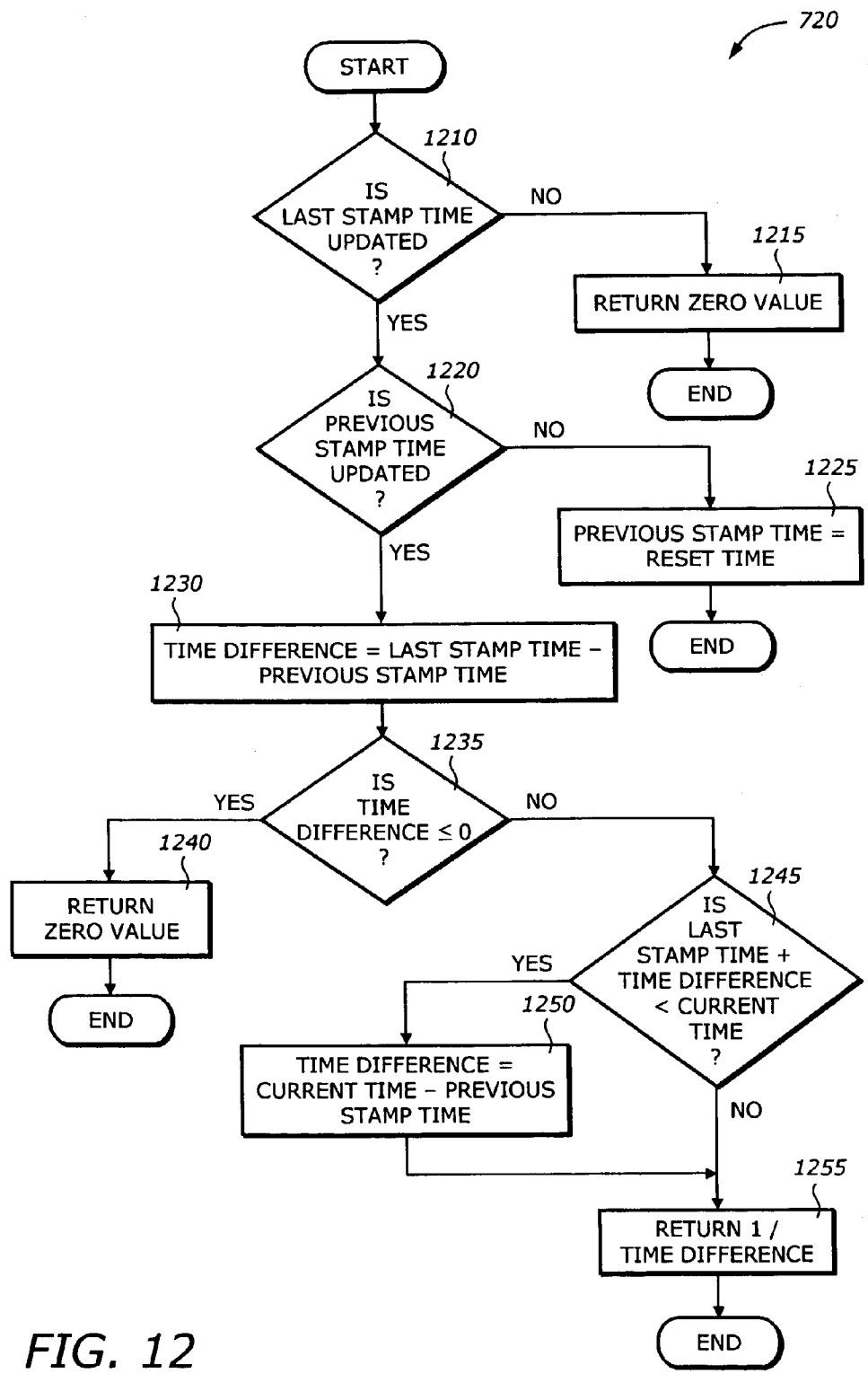
FIG. 12 is a flowchart illustrating a process to compute rate of change according to one embodiment of the invention.

FIG. 12 is a flowchart illustrating the process 720 to compute rate of change according to one embodiment of the invention. The process 720 in essence reflects the method getRate( ) 340.

Upon START, the process 720 determines if the last stamp time is updated (Block 1210). If not, the process 720 returns the zero value (Block 1215) and is then terminated. Otherwise, the process 720 determines if the previous stamp time is updated (Block 1220). If not, the process 720 sets the previous stamp time to the next time (Block 1225) and is then terminated. Otherwise, the process 720 sets the time difference to be the difference between the last stamp time and the previous stamp time (Block 1230).

Next, the process 720 determines if the time difference is less than or equal to zero (Block 1235). If so, the process 720 returns a zero value (Block 1240) and is then terminated. Otherwise, the process 720 determines if the sum of the last stamp time and the time difference is less than the current time (Block 1245). If so, the process 720 sets the time difference to be the difference between the current time and the previous stamp time (Block 1250) and proceeds to Block 1255. Otherwise the process 720 returns the inverse of the time difference (Block 1255) and is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   associating a time function to an event object and a rule object in a rule engine using a dynamic object, the event object representing one of an event and a fact, the rule object representing a rule associated with the event object;
   obtaining time-related information on the dynamic object using a timed fact object and the time function, the timed fact object corresponding to the event object;
   updating a time queue containing the timed fact object using the time-related information, the updated time queue updating status of a condition of the rule; and
   wherein associating the time function comprises:
      performing a timestamp on one of the event and rule objects to update at least one of a last stamp time and a previous stamp time of the associated dynamic object;
      computing a rate of change using at least one of the last and previous stamp times; and
      wherein computing the rate of change comprises:
         computing number of occurrences per time unit of the timestamp.

2. The method of claim 1 wherein obtaining time-related information comprises:
   creating the timed fact object associated with a time-sensitive event or fact in the event object;
   setting attributes of the timed fact object, the attributes including at least a dynamicity, a next time indicating when the timed fact object is asserted, a time unit, and an occurrence time interval, the dynamicity being one of a current time dynamicity, an elapsed time dynamicity, a rate occurrence dynamicity, and a timestamp occurrence dynamicity,
   obtaining a data value of the timed fact object according to the dynamicity,
   predicting a satisfied time indicating when the data value satisfies the condition of the rule; and
   updating the next time using the satisfied time.

3. The method of claim 2 wherein updating the time queue comprises:
   asserting the timed fact object that has the next time being an earliest value;
   removing the asserted time fact object from the time queue if the data value of the asserted time fact object meets the condition;
   re-queueing the asserted timed fact object to the time queue if the data value of the asserted time fact object does not meet the condition.

4. The method of claim 2 wherein performing a timestamp comprises:
   updating an occurrence count in a window corresponding to the occurrence time interval, the occurrence count indicating number of times the one of the event and rule objects is timestamped; and
   updating the window.

5. The method of claim 4 wherein predicting the satisfied time comprises:
   receiving a comparison value and an optional delta value having first and second end delta values;
   initialing the satisfied time to a current time; and
   updating the satisfied time according to the dynamicity.

6. The method of claim 5 wherein updating the satisfied time comprises:
   setting first and second end values to first and second end delta values, respectively, if the optional data value is not zero;

setting first and second end values to the comparison value if the optional delta value is zero;

adjusting the satisfied time to difference of the first and second end values if the dynamicity is the current time dynamicity or the elapsed time dynamicity, adjusting the satisfied time to difference of first and second rate values if the dynamicity is the rate occurrence dynamicity, the first rate value being equal to a first sum of inverse of the first end value and the previous stamp time, the second rate value being equal to a second sum of inverse of the second end value and the previous time;

adjusting the satisfied time to a third sum of a displacement value to the initialized satisfied time if the dynamicity is the timestamp occurrence dynamicity, the displacement being equal to a ratio between a comparison difference and the rate of change, the comparison difference being difference between the comparison value and a current numeric value;

setting the satisfied time to zero if the adjusted satisfied time is less than the initialized satisfied time.

7. The method of claim 1 wherein computing the number of occurrences comprises:

returning a zero value if the last stamp time is not updated;

setting the previous stamp time to a reset time of the rule engine if the previous stamp time is not updated;

computing a time difference equal to difference between the last stamp time and the previous stamp time;

returning a zero value if the time difference is less than or equal to zero;

adjusting the time difference to difference between a current time and the previous stamp time if a sum between the last stamp time and the time difference is less than the current time;

returning inverse of the adjusted time difference.

8. The method of claim 1 further comprising:

placing the rule in a rule agenda.

9. An article of manufacture comprising:

a machine-accessible medium including data that, when accessed by a machine, causes the machine to perform operations comprising:

associating a time function to an event object and a rule object in a rule engine using a dynamic object, the event object representing one of an event and a fact, the rule object representing a rule associated with the event object;

obtaining time-related information on the dynamic object using a timed fact object and the time function, the timed fact object corresponding to the event object;

updating a time queue containing the timed fact object using the time-related information, the updated time queue updating status of a condition of the rule; and wherein the data causing the machine to perform associating the time function comprises data that, when executed by the machine, causes the machine to perform operations comprising:

performing a timestamp on one of the event and rule objects to update at least one of a last stamp time and a previous stamp time of the associated dynamic object;

computing a rate of change using at least one of the last and previous stamp times; and wherein the data causing the machine to perform computing the rate of change comprises data that, when executed by the machine, causes the machine to perform operations comprising:

computing number of occurrences per time unit of the timestamp.

10. The article of manufacture of claim 9 wherein the data causing the machine to perform obtaining time-related information comprises data that, when executed by the machine, causes the machine to perform operations comprising:

creating the timed fact object associated with a time-sensitive event or fact in the event object;

setting attributes of the timed fact object, the attributes including at least a dynamicity, a next time indicating when the timed fact object is asserted, a time unit, and an occurrence time interval, the dynamicity being one of a current time dynamicity, an elapsed time dynamicity, a rate occurrence dynamicity, and a timestamp occurrence dynamicity;

obtaining a data value of the timed fact object according to the dynamicity;

predicting a satisfied time indicating when the data value satisfies the condition of the rule; and updating the next time using the satisfied time.

11. The article of manufacture of claim 10 wherein the data causing the machine to perform updating the time queue comprises data that, when executed by the machine, causes the machine to perform operations comprising:

asserting the timed fact object that has the next time being an earliest value;

removing the asserted time fact object from the time queue if the data value of the asserted time fact object meets the condition;

re-queueing the asserted timed fact object to the time queue if the data value of the asserted time fact object does not meet the condition.

12. The article of manufacture of claim 10 wherein the data causing the machine to perform a timestamp comprises data that, when executed by the machine, causes the machine to perform operations comprising:

updating an occurrence count in a window corresponding to the occurrence time interval, the occurrence count indicating number of times the one of the event and rule objects is timestamped; and updating the window.

13. The article of manufacture of claim 12 wherein the data causing the machine to perform predicting the satisfied time comprises data that, when executed by the machine, causes the machine to perform operations comprising:

receiving a comparison value and an optional delta value having first and second end delta values;

initializing the satisfied time to a current time; and updating the satisfied time according to the dynamicity.

14. The article of manufacture of claim 13 wherein the data causing the machine to perform updating the satisfied time comprises data that, when executed by the machine, causes the machine to perform operations comprising:

setting first and second end values to first and second end delta values, respectively, if the optional data value is not zero;

setting first and second end values to the comparison value if the optional delta value is zero;

adjusting the satisfied time to difference of the first and second end values if the dynamicity is the current time dynamicity or the elapsed time dynamicity, adjusting the satisfied time to difference of first and second rate values if the dynamicity is the rate occurrence dynamicity, the first rate value being equal to a first sum of inverse of the first end value and the previous stamp time, the second rate value being equal to a second sum of inverse of the second end value and the previous time;
adjusting the satisfied time to a third sum of a displacement value to the initialized satisfied time if the dynamicity is the timestamp occurrence dynamicity, the displacement being equal to a ratio between a comparison difference and the rate of change, the comparison difference being difference between the comparison value and a current numeric value;
setting the satisfied time to zero if the adjusted satisfied time is less than the initialized satisfied time.

15. The article of manufacture of claim 11 wherein the data causing the machine to perform computing the number of occurrences comprises data that, when executed by the machine, causes the machine to perform operations comprising:
returning a zero value if the last stamp time is not updated;
setting the previous stamp time to a reset time of the rule engine if the previous stamp time is not updated;
computing a time difference equal to difference between the last stamp time and the previous stamp time;
returning a zero value if the time difference is less than or equal to zero;
adjusting the time difference to difference between a current time and the previous stamp time if a sum between the last stamp time and the time difference is less than the curt time;
returning inverse of the adjusted time difference.

16. The article of manufacture of claim 9 wherein the data further comprises data that, when executed by the machine, causes the machine to perform operations comprising:
placing the rule in a rule agenda.

17. A system comprising:
a processor; and
a memory coupled to the processor, the memory containing instructions that, when executed by the processor, causes the processor to:
associate a time function to an event object and a rule object in a rule engine using a dynamic object, the event object representing one of an event and a fact, the rule object representing a rule associated with the event object,
obtain time-related information on the dynamic object using a timed fact object and the time function, the timed fact object corresponding to the event object, and
update a time queue containing the timed fact object using the time-related information, the updated time queue updating status of a condition of the rule; and
wherein the instructions causing the processor to associate the time function comprises instructions that, when executed by the processor, causing the processor to:
perform a timestamp on one of the event and rule objects to update at least one of a last stamp time and a previous stamp time of the associated dynamic object;
compute a rate of change using at least one of the last and previous stamp times; and
wherein the instructions causing the processor to compute the rate of change comprises instructions that, when executed by the processor, causing the processor to:
compute number of occurrences per time unit of the timestamp.

18. The system of claim 17 wherein the instructions causing the processor to obtain time-related information comprises instructions that, when executed by the processor, causing the processor to:
create the timed fact object associated with a time-sensitive event or fact in the event object;
set attributes of the timed fact object, the attributes including at least a dynamicity, a next time indicating when the timed fact object is asserted, a time unit, and an occurrence time interval, the dynamicity being one of a current time dynamicity, an elapsed time dynamicity, a rate occurrence dynamicity, and a timestamp occurrence dynamicity;
obtain a data value of the timed fact object according to the dynamicity;
predict a satisfied time indicating when the data value satisfies the condition of the rule; and
update the next time using the satisfied time.

19. The system of claim 18 wherein the instructions causing the processor to update the time queue comprises instructions that, when executed by the processor, causing the processor to:
assert the timed fact object that has the next time being an earliest value;
remove the asserted time fact object from the time queue if the data value of the asserted time fact object meets the condition;
re-queue the asserted timed fact object to the time queue if the data value of the asserted time fact object does not meet the condition.

20. The system of claim 18 wherein the instructions causing the processor to perform a timestamp comprises instructions that, when executed by the processor, causing the processor to:
update an occurrence count in a window corresponding to the occurrence time interval, the occurrence count indicating number of times the one of the event and rule objects is timestamped; and
update the window.

21. The system of claim 20 wherein the instructions causing the processor to predict the satisfied time comprises instructions that, when executed by the processor, causing the processor to:
receive a comparison value and an optional delta value having first and second end delta values;
initialize the satisfied time to a current time; and
update the satisfied time according to the dynamicity.

22. The system of claim 21 wherein the instructions causing the processor to update the satisfied time comprises instructions that, when executed by the processor, causing the processor to:
set first and second end values to first and second end delta values, respectively, if the optional data value is not zero;
set first and second end values to the comparison value if the optional delta value is zero;
adjust the satisfied time to difference of the first and second end values if the dynamicity is the current time dynamicity or the elapsed time dynamicity,
adjust the satisfied time to difference of first and second rate values if the dynamicity is the rate occurrence dynamicity, the first rate value being equal to a first sum of inverse of the first end value and the previous stamp time, the second rate value being equal to a second sum of inverse of the second end value and the previous time;

adjust the satisfied time to a third sum of a displacement value to the initialized satisfied time if the dynamicity is the timestamp occurrence dynamicity, the displacement being equal to a ratio between a comparison difference and the rate of change, the comparison difference being difference between the comparison value and a current numeric value;

set the satisfied time zero if the adjusted satisfied time is less than the initialized satisfied time.

23. The system of claim 21 wherein the instructions causing the processor to compute the number of occurrences comprises instructions that, when executed by the processor, causing the processor to:

return a zero value if the last stamp time is not updated;

set the previous stamp time to a reset time of the rule engine if the previous stamp time is not updated;

compute a time difference equal to difference between the last stamp time and the previous stamp time;

return a zero value if the time difference is less than or equal to zero;

adjust the time difference to difference between a current time and the previous stamp time if a sum between the last stamp time and the time difference is less than the current time;

return inverse of the adjusted time difference.

24. The system of claim 17 wherein the instructions further comprises instructions that, when executed by the processor, causing the processor to:

place the rule in a rule agenda.

* * * * *